United States Patent

[11] 3,588,207

| [72] | Inventor | Daniel F. Greby |
| | | Buena Park, Calif. |
| [21] | Appl. No. | 4,168 |
| [22] | Filed | Jan. 15, 1970 |
| [45] | Patented | June 28, 1971 |
| [73] | Assignee | Industrial Tectonics, Inc. |
| | | Ann Arbor, Mich. |
| | | Continuation of application Ser. No. 616,667, Feb. 16, 1967, now abandoned. |

[54] ROLLING ELEMENT RETAINER HAVING ELEMENT RETAINING TABS
4 Claims, 5 Drawing Figs.

| [52] | U.S. Cl. | 308/201, 308/217, 29/148.4 |
| [51] | Int. Cl. | F16c 19/20 |
| [50] | Field of Search | 308/201, 217, 199, 193, 188; 29/148.4 (C) |

[56] References Cited

UNITED STATES PATENTS

| 2,327,237 | 8/1943 | Baden | 29/148.4 |
| 2,557,476 | 6/1951 | Schwitter | 308/201 |
| 3,003,830 | 10/1961 | Blazer et al. | 308/6 |
| 3,188,719 | 6/1965 | Howles | 29/148.4 |
| 3,399,936 | 9/1968 | Vannest | 308/201 |
| 3,486,212 | 12/1969 | Vannest | 29/148.4C |

FOREIGN PATENTS

| 553,865 | 1/1957 | Belgium | |

Primary Examiner—Carroll B. Dority, Jr.

ABSTRACT: A one-piece solid ring having circumferentially spaced pockets which have planar sides, each pocket having its circumferentially facing sides spaced-apart substantially a distance equal to the diameter of the rolling element and each pocket having tab means on the sides thereof projecting into the pocket to retain the rolling element therein.

PATENTED JUN 28 1971

3,588,207

INVENTOR.
DANIEL F. GREBY

BY
Woodhams, Blanchard & Flynn
ATTORNEYS

ROLLING ELEMENT RETAINER HAVING ELEMENT RETAINING TABS

This application is a continuation of application Ser. No. 616,667 filed Feb. 16, 1967 and now abandoned.

The purpose of this invention is to overcome the manufacturing objection of ball and roller retainers now made wherein the bearing retaining means are formed by the commonly known process of cold working metal. In previous bearings of this nature, the cages or retainers were manufactured from malleable metals such as bronzes and soft steels. These types of metals permitted bending and deforming of the cages without causing rupture of the metal of the deformed part. For example, in some types of retainers, such as those shown in U.S. Pat. Nos. 2,998,635 or 3,188,719, tabs or projections extend over the space in which the roller is located. The bending of these tabs is done after the roller is placed in the space. The malleability of the metals permits bending without rupturing the metal and without the necessity of performing any subsequent heat treatment of the cage or the retainer.

However, for many uses, as where bearings are operated for long periods of time and or at relatively high speeds and temperatures, harder and more wear resistant metals are required for the cages and retainers. In these cases the former methods for forming tabs on the cages for the retention of the rollers therein are unacceptable because the hardness and consequent lower ductility of the metals involved causes the tabs either to crack in the manufacturing operation or to develop microscopic cracks which cause subsequent failure of the bearing in operation. Thus, a need has existed for a better method, particularly applicable to materials of low ductility, of creating bearing retention means on the cages and retainers which do not result in subsequent bearing failure and a method which can be performed at a relatively low cost of manufacturing.

Accordingly, it is an object of this invention to provide in an inexpensive manner trouble-free roller bearing retainers made from a material having a low ductility.

Another object of the invention is to provide tabs on bearing retainers made from a material having a low ductility without having to perform a bending operation thereon and risking resultant ruptures.

It is a further object of this invention to provide bearing pockets having planar surfaces for low friction operation of the bearings within the bearing pockets.

Other objects and purposes of the invention will become apparent to persons acquainted with products of this general type upon reading the following disclosure and inspecting the accompanying drawing.

DETAILED DESCRIPTION

Figure 1:
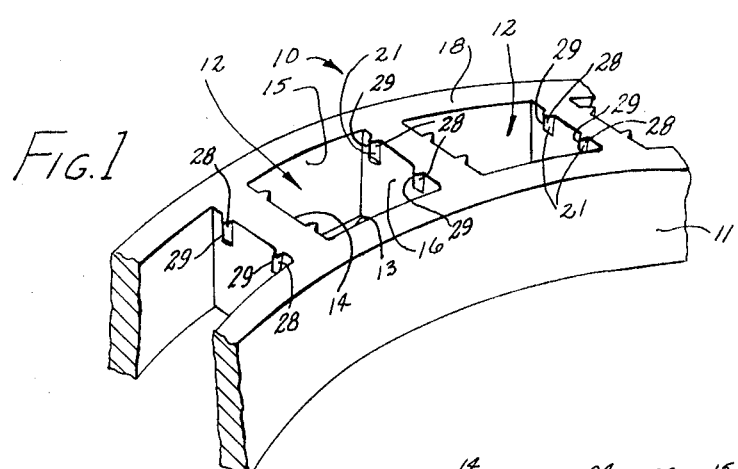
FIG. 1 is a perspective view of a bearing retainer embodying the invention.

A cage 10 for retaining bearings is illustrated in FIG. 1. The cage 10 comprises a solid ring 11 having a plurality of circumferentially spaced pockets 12 along the circumference, here the central circumference, of the ring 11. The pockets in FIG. 1 are illustrated as being rectangular in shape, however, it is recognized that the pockets can be of any shape as long as said pockets will accommodate the desired type of a rolling element.

The pockets 12 have four planar side walls 13, 14, 15 and 16, in which circumferential side walls 14 and 16 are essentially parallel with the axis of the ring 11 and are spaced substantially the distance of the diameter of the rolling element. The pockets 12 extend through the solid ring and are open at the inner surface of the ring 11 as well as at the outer surface 18.

Tab means 21 are positioned on the walls 14 and 16 and project into the pockets 12. More particularly, the tab means 21 are integral with the ring 11 and are so positioned in the pocket 12 that one end of the tab is flush with the outer surface 18 of the ring 11 while the other end of the tab is spaced radially outwardly from the inner surface 17 of the ring 11. Each tab means 21 comprise a rib 28 of substantially constant cross section through a majority of its radial length and having a radially extending linear profile 29 parallel to the walls, the rib 28 having sides extending from the respective one of the pocket walls 14 and 16 toward the interior of the pocket 12, such sides converging to an apex defining the profile 29. Each rib has a bottom surface 30 substantially facing toward the inner surface 17 of the ring 11, which bottom surface slopes from the respective one of the pocket walls 14 and 16 toward the outer surface 18 of the ring 11. In the embodiment illustrated in FIG. 1, two tabs are positioned on each of the walls 14 and 16 so that they are equally spaced from the walls 13 and 15. It is recognized that in some instances only one tab 21 need be placed on each of the circumferential walls 14 or 16 to project circumferentially into the pockets 12 to perform essentially the same function as the two tabs on each wall illustrated in FIG. 1. However, a single tab on either one of the circumferential walls 14 or 16 would have to be placed on the central circumferential line of the ring 11 so that a roller within the pocket 12 could be retained therein and not be capable of escaping from the pocket 12 on either axial side of the single tab.

Figure 5:
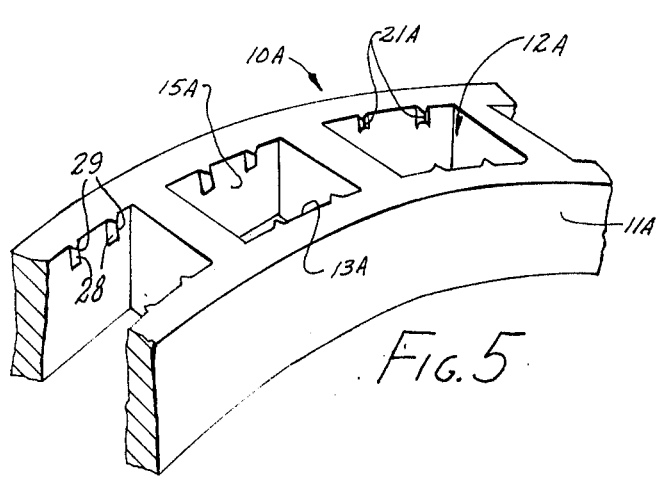
FIG. 5 is a perspective view of a modified bearing retainer.

A modified cage construction 10A is illustrated in FIG. 5. The only difference between this construction and the construction illustrated in FIG. 1 is the placement of a pair of tabs 21A on the axial sidewalls 13A and 15A of the ring 11A.

METHOD OF MANUFACTURE

Figure 2:
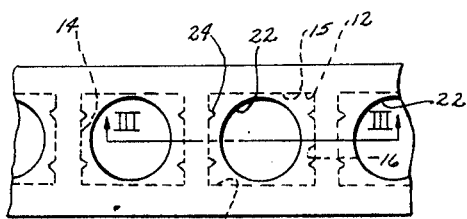
FIG. 2 is a planar view of the bearing retainer shown in FIG. 1.
Figure 4:
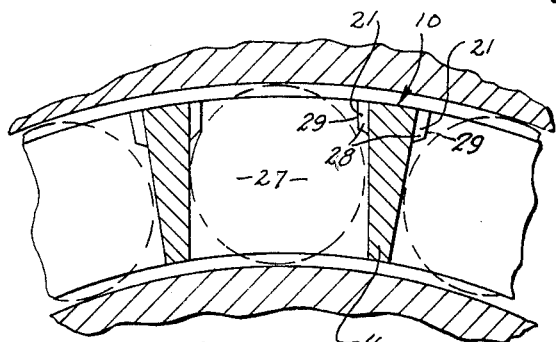
FIG. 4 is a sectional view of a bearing pocket taken on the same plane as FIG. 3 and illustrating the tabs projecting into the bearing pocket.
Figure 3:
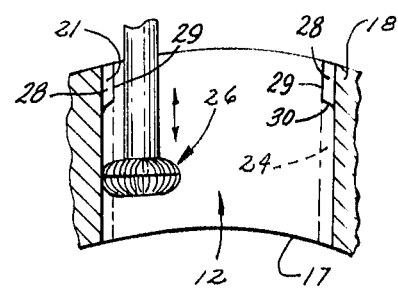
FIG. 3 is a sectional view taken along line III–III in FIG. 2.

The method of manufacturing bearing pockets above described comprises the steps illustrated in FIGS. 2, 3 and 4. These are the steps of first drilling circular, radially positioned, openings 22 and spacing said openings circumferentially along the central circumferential line of the ring 11. Conveniently said openings are drilled diametrically from one side of the ring 11 to the other side.

The next step includes broaching the ring 11 to form the circular openings 22 into pockets 12 (broken lines in FIG. 2) having planar sides 13, 14, 15 and 16. Sides 14 and 16 are preferably parallel with the axis of the ring 11. The broach is slotted so that rib means are formed on a desired pair of opposite facing sides, 14 and 16 in FIG. 1. The rib means 24 thus project circumferentially into the pocket and extend from the radially inner surface 17 outwardly to the radially outer surface 18 of the ring 11.

The rib means 24 are then partially removed, preferably by a milling operation, from the sidewalls of the pockets 12. More particularly, a milling tool 26 (FIG. 3) is inserted into the pockets 12 and moved radially with respect to the ring so that the rib 24 is removed from the radially inner surface 17 to a point adjacent the radially outer surface 18, but spaced radially sufficiently inwardly therefrom to position the inner end of the resulting tab 21 at the desired location.

The method of manufacture of the embodiments illustrated in FIG. 5 is essentially the same. Thus, the method of producing the embodiment shown in FIG. 5 will not hereinafter be discussed excepting to note that the broach used here is slotted to provide the tabs 21A at the sides of the openings 12A as shown.

After the above-discussed method of manufacture has been performed, the rolling elements 27 placed into the pockets 12 will not be capable of movement radially due to the circumferentially projecting tabs 21 (FIGS. 1–4) or the axial projecting tabs 21A (FIG. 5) on the walls of the pockets 12 and 12A. Although in the present embodiment the tabs are positioned to hold the rolling elements against movement radially outwardly the tabs can be also located adjacent the radially inward edge of the retainer 11 to hold the rolling elements against movement radially inwardly. Thus, bearing retaining means have been provided on the one-piece bearing retaining cages 10 and 10A and said bearing retaining means have been produced by a method which does not require a cold working of metal.

Although a particular preferred embodiment of the invention has been disclosed in detail for illustrative purposes, it will be recognized that variations or modifications of the disclosed apparatus lie within the scope of the present invention.

I claim:

1. A bearing cage for retaining bearings, comprising:
   a one-piece ring having radially inner and outer surfaces thereon, an axially spaced pair of axially facing surfaces and a plurality of circumferentially spaced pockets therethrough arranged parallel to a central circumferential line between the axially facing surfaces of said ring, each of said pockets having radially inner and outer edges flush with said radially inner and outer surfaces and a pair of oppositely facing planar sidewalls being spaced substantially the distance of the diameter of a bearing;
   an elongated tab on each oppositely facing planar sidewall in each of said pockets and projecting inwardly therein, each tab being located entirely within its respective pocket with one end thereof being adjacent one of said radial surfaces, the other end of each tab extending radially toward but being spaced substantially from the other of said radial surfaces, each tab consisting of a rib of substantially constant cross section through the majority of its radial length and having a linear profile extending radially parallel to said planar sidewall, said rib having sides extending from said sidewall toward the interior of said pocket, said sides converging to an apex, said rib having a bottom surface substantially facing toward said other radial surface, said bottom surface sloping from said sidewall toward said one of said radial surfaces;
   whereby said one of said radial surfaces is free of obstruction by said tabs and said oppositely facing sidewalls are tangent to the surfaces of said bearings in said pockets and said tabs in each of said pockets restrain said bearing against movement toward said one radial surface of said ring.

2. A bearing cage according to claim 1, wherein said pockets are rectangular shaped.

3. A bearing cage according to claim 1, wherein said oppositely facing planar sidewalls face in a direction parallel to the central axis of said ring.

4. A bearing cage according to claim 1, wherein said oppositely facing planar sidewalls face in a direction perpendicular to the central axis of said ring.